(12) United States Patent
Agaoglu et al.

(10) Patent No.: US 12,250,474 B2
(45) Date of Patent: Mar. 11, 2025

(54) EYE TRACKING USING EFFICIENT IMAGE CAPTURE AND VERGENCE AND INTER-PUPILLARY DISTANCE HISTORY

(71) Applicant: Apple Inc., Cupertino, CA (US)

(72) Inventors: Mehmet N. Agaoglu, Dublin, CA (US); Andrew B. Watson, Los Gatos, CA (US)

(73) Assignee: Apple Inc., Cupertino, CA (US)

( * ) Notice: Subject to any disclaimer, the term of this patent is extended or adjusted under 35 U.S.C. 154(b) by 94 days.

(21) Appl. No.: 18/101,320

(22) Filed: Jan. 25, 2023

(65) Prior Publication Data

US 2023/0239586 A1 Jul. 27, 2023

Related U.S. Application Data

(60) Provisional application No. 63/303,109, filed on Jan. 26, 2022.

(51) Int. Cl.
*H04N 23/951* (2023.01)
*G06F 3/01* (2006.01)
*G06T 7/70* (2017.01)
*H04N 23/611* (2023.01)

(52) U.S. Cl.
CPC ........... *H04N 23/951* (2023.01); *G06F 3/013* (2013.01); *G06T 7/70* (2017.01); *H04N 23/611* (2023.01)

(58) Field of Classification Search
CPC ...... H04N 23/951; H04N 23/611; G06T 7/70; G06F 3/013
See application file for complete search history.

(56) References Cited

U.S. PATENT DOCUMENTS

| 11,886,635 | B2 * | 1/2024 | Komaki | A61B 5/6803 |
| 2014/0078283 | A1 | 3/2014 | Nistico et al. | |
| 2015/0062322 | A1 * | 3/2015 | Gustafsson | H04R 1/32 348/78 |
| 2016/0217760 | A1 | 7/2016 | Chu et al. | |

FOREIGN PATENT DOCUMENTS

| EP | 3835925 | 6/2021 |
| WO | 2019/168275 A1 | 9/2019 |
| WO | WO 2019168275 | 9/2019 |
| WO | WO-2022020434 A1 * | 1/2022 ............. A61B 3/113 |

OTHER PUBLICATIONS

European Patent Office (ISA/EP), International Search Report and Written Opinion, International Application No. PCT/US2023/011492, 13 pages, May 15, 2023.

* cited by examiner

*Primary Examiner* — Doon Y Chow
(74) *Attorney, Agent, or Firm* — Thompson Hine LLP

(57) ABSTRACT

Tracking an eye characteristic (e.g., gaze direction or pupil position) of a user's eyes by staggering image capture and using a predicted relationship between the user's eyes between eye captures to predict that eye's eye characteristic between those eye captures. Images of a user's eyes are captured in a staggered manner in the sense that the images of second eye are captured between the capture times of the images of the first eye and vice versa. An eye characteristic of the first eye at the capture times is determined based on the images of the first eye at those times. In addition, the eye characteristic of that first eye is predicted at additional times between captures based on a predicted relationship between the eyes.

17 Claims, 4 Drawing Sheets

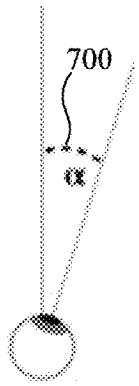 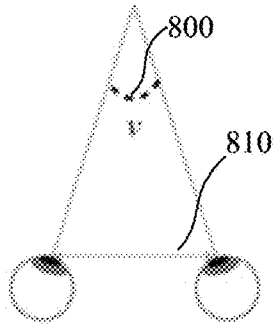 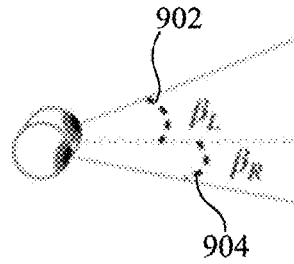
FIG. 7  FIG. 8  FIG. 9
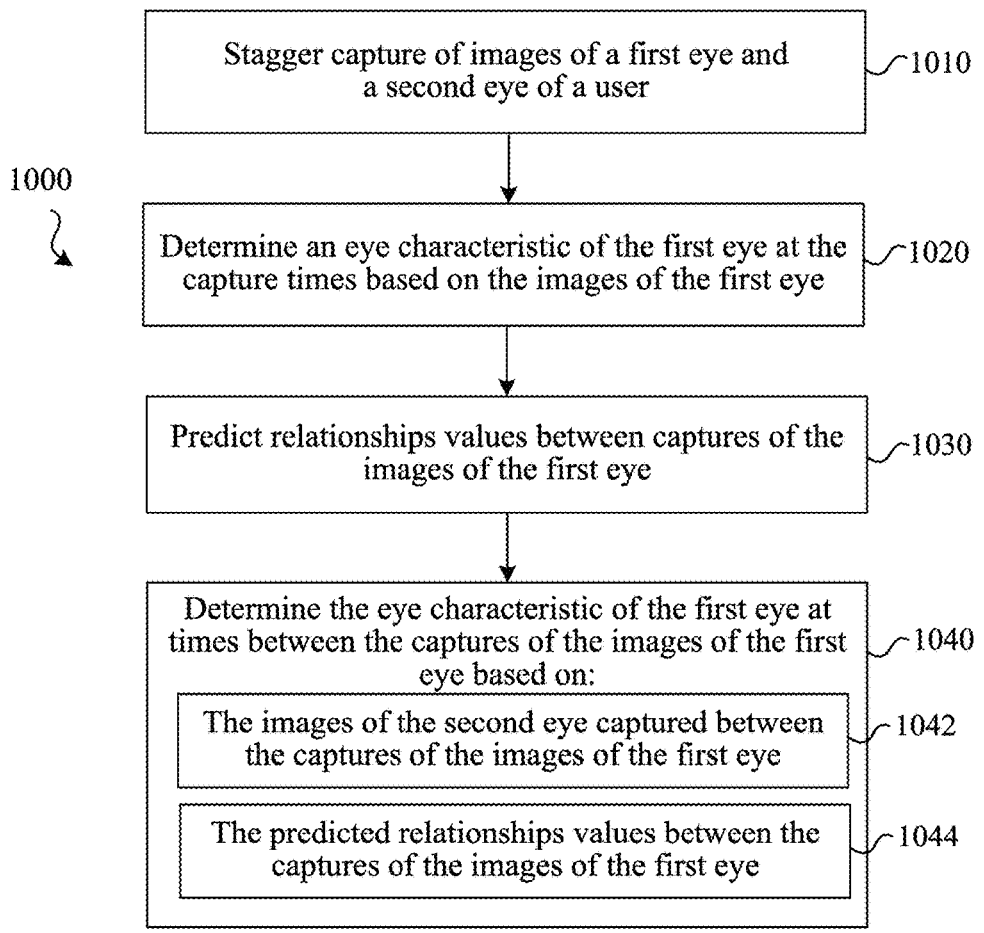
FIG. 10

EYE TRACKING USING EFFICIENT IMAGE CAPTURE AND VERGENCE AND INTER-PUPILLARY DISTANCE HISTORY

CROSS-REFERENCE TO RELATED APPLICATIONS

This application claims the benefit of U.S. Provisional Application Ser. No. 63/303,109 filed Jan. 26, 2022, which is incorporated herein in its entirety.

TECHNICAL FIELD

The present disclosure generally relates to assessing characteristics of eyes such as gaze directions and pupil position, and in particular, to systems, methods, and devices for tracking eye characteristics in both of a user's eyes by staggering image capture to improve efficiency.

BACKGROUND

Some existing eye tracking systems use light reflected off the surface of an eye to estimate eye characteristics. For example, camera images may be captured and used to identify multiple glint reflections on an eye surface to estimate eye shape, position, orientation, and/or gaze direction. Tracking eye characteristics with high temporal resolution requires capturing and processing images of the eye at a high frame rate, which, in turn, may impose significant power and resource requirements on an eye tracking system.

SUMMARY

Various implementations track an eye characteristic (e.g., gaze direction or pupil position) of a user's eyes by staggering image capture of each eye and using a predicted relationship between the user's eyes between eye captures to predict that eye's eye characteristic between those eye captures. Images of a user's eyes are captured in a staggered manner in the sense that the images of second eye are captured between the capture times of the images of the first eye and vice versa. An eye characteristic of the first eye at the capture times is determined based on the images of the first eye at those times. In addition, the eye characteristic of that first eye is also predicted at additional times between the eye image captures. For example, relationships between the first eye and the second eye between captures of the images of the first eye may be predicted and used to predict the eye characteristic of the first eye between the captures of the images of the first eye. The eye characteristic of the first eye between the captures of the images of the first eye may be based on the images of the second eye captured between the captures of the images of the first eye and the predicted relationships between the captures of the images of the first eye.

Some implementations provide a device that tracks gaze directions of a user's two eyes by staggering image capture of each eye and uses vergence history to predict the other eye's gaze direction for intermediate frames between captures. For example, to determine gaze directions for both eyes at N fps rate, staggered images of each eye may be captured at N/2 fps with 1/N seconds in between image captures of the first and second eyes, and the intermediate gaze directions between frames for each eye may be predicted based on the other eye's gaze direction at each intermediate frame time and a predicted vergence at that time. In one example, a device includes one or more image sensors configured to stagger capture of images of a first eye and a second eye of a user, where images of the first eye are captured at approximately a first frame rate at capture times and images of the second eye are captured at approximately the first frame rate. The images of second eye are captured between the capture times of the images of the first eye. The device also includes a processor and a computer-readable storage medium comprising instructions that upon execution by one or more processors cause the device to perform operations. The operations involve determining gaze directions of the first eye at the capture times based on the images of the first eye. The operations also involve predicting vergence values between captures of the images of the first eye and determining gaze directions of the first eye at times between the captures of the images of the first eye. The gaze directions of the first eye at times between the captures of the images of the first eye may be based on the images of the second eye captured between the captures of the images of the first eye and the predicted vergence values between the captures of the images of the first eye.

Some implementations provide a device that tracks pupil positions of a user's two eyes by staggering image capture of each eye and uses instantaneous IPD to predict the other eye's pupil position for intermediate frames. For example, to determine pupil positions for both eyes at N fps rate, staggered images of each eye may be captured at N/2 fps and the intermediate pupil positions between frames for each eye predicted based on the other eye's pupil position at each intermediate frame time and a predicted instantaneous IPD at that time. In one example, a device includes one or more image sensors configured to stagger capture of images of a right eye and a left eye of a user, where images of the first eye are captured at approximately a first frame rate at capture times and images of the second eye are captured at approximately the first frame rate. The images of second eye are captured between the capture times of the images of the first eye. The device further includes a processor and a computer-readable storage medium comprising instructions that upon execution by one or more processors cause the device to perform operations. The operations involve determining pupil positions of the first eye at the capture times based on the images of the first eye. The operations further involve predicting interpupillary distances (IPD) values between captures of the images of the first eye and determining pupil positions of the first eye at times between the captures of the images of the first eye. The pupil positions of the first eye at times between the captures of the images of the first eye may be determined based on the images of the second eye captured between the captures of the images of the first eye and the predicted IPD values between the captures of the images of the first eye.

In accordance with some implementations, a device includes one or more processors, a non-transitory memory, and one or more programs; the one or more programs are stored in the non-transitory memory and configured to be executed by the one or more processors and the one or more programs include instructions for performing or causing performance of any of the methods described herein. In accordance with some implementations, a non-transitory computer readable storage medium has stored therein instructions, which, when executed by one or more processors of a device, cause the device to perform or cause performance of any of the methods described herein. In accordance with some implementations, a device includes: one or more processors, a non-transitory memory, and means for performing or causing performance of any of the methods described herein.

BRIEF DESCRIPTION OF THE DRAWINGS

So that this disclosure can be understood by those of ordinary skill in the art, a more detailed description may be had by reference to aspects of illustrative implementations, some of which are shown in the accompanying drawings.

FIG. 7 illustrates an example monocular horizontal gaze angle.

FIG. 8 illustrates an example horizontal vergence.

FIG. 9 illustrates example monocular vertical gaze angles used to determine a vertical vergence.

FIG. 10 is a flowchart representation of a method of tracking an eye characteristic in accordance with some implementations.

Figure 1:
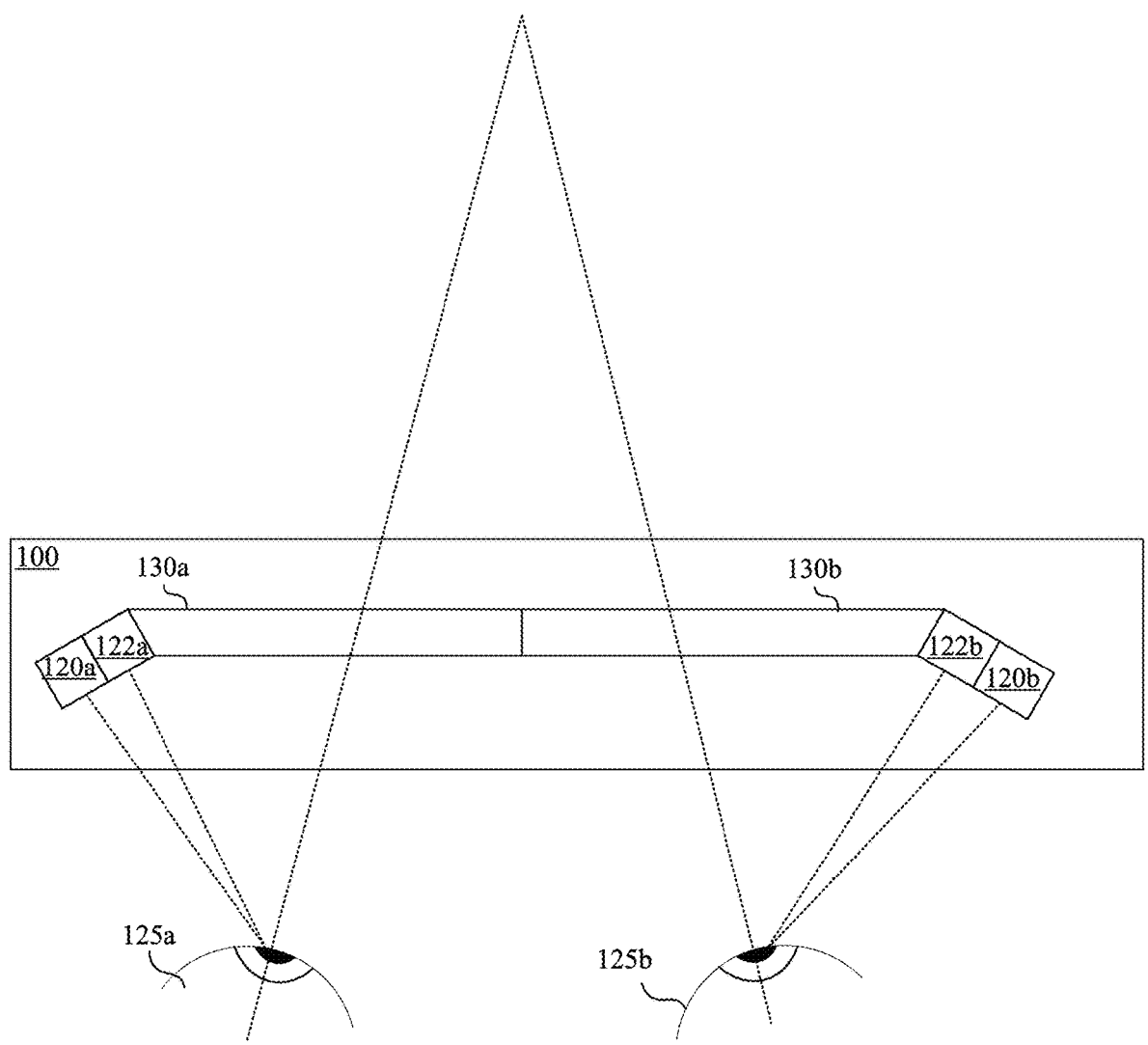
FIG. 1 illustrates an example device for tracking a user's eyes in accordance with some implementations.

In accordance with common practice the various features illustrated in the drawings may not be drawn to scale. Accordingly, the dimensions of the various features may be arbitrarily expanded or reduced for clarity. In addition, some of the drawings may not depict all of the components of a given system, method or device. Finally, like reference numerals may be used to denote like features throughout the specification and figures.

DESCRIPTION

Numerous details are described in order to provide a thorough understanding of the example implementations shown in the drawings. However, the drawings merely show some example aspects of the present disclosure and are therefore not to be considered limiting. Those of ordinary skill in the art will appreciate that other effective aspects and/or variants do not include all of the specific details described herein. Moreover, well-known systems, methods, components, devices and circuits have not been described in exhaustive detail so as not to obscure more pertinent aspects of the example implementations described herein.

FIG. 1 illustrates tracking two eyes 125a, 125b of a user using a device 100 that has two eye cameras 120a, 120b (one camera for each eye). While pertinent features are shown, those of ordinary skill in the art will appreciate from the present disclosure that various other features have not been illustrated for the sake of brevity and so as not to obscure more pertinent aspects of the example implementations disclosed herein.

The device 100 (e.g., an eye-glasses device or other head-mounted device (HMD)) includes the two eye cameras 120a, 120b, two illuminators 122a, 122b, and two content viewing portions 130a, 130b. These components may be embedded within or attached to a housing or other portion of device 100. For example, if device 100 is an eye-glasses device, two eye cameras 120a, 120b and two illuminators 122a, 122b may be embedded in a frame portion (not shown) of the eye-glasses device that surrounds or supports the two content viewing portions 130a, 130b.

The illuminators 122a, 122b may be configured and positioned to illuminate a respective eye 125a, 125b and or surrounding areas with light for the purpose of facilitating eye tracking. The illuminators 122a, 122b may emit light towards the eyes 125a, 125b of the user, which reflects in the form of one or more glints off the surface of the eyes 12a, 125b. The illuminators 122a, 122b may be configured to emit light in a near-infrared wavelength range (e.g., a wavelength range within the near-infrared spectrum of approximately 700-1400 nm). Each of the illuminators 122a, 122b may be comprised of a plurality of illuminators that may be operated either synchronously or asynchronously.

The eye cameras 120a, 120b may each include one or more photo sensors, other sensors, and/or processing components that use received light to track an eye characteristic of the eyes 125a, 125. For example, the illuminator 122a may emit light onto the eye 125a that reflects as a light pattern (e.g., a circle of glints) that can be detected by an eye camera 120a. Based on image data (e.g., of the eye 125a and/or a reflected glint pattern) captured by the eye camera 120a, the device 100 can determine an eye tracking characteristic. For example, the device 100 may use the image data to determine a gaze direction and/or a pupil position of the eye 125a. Thus, in various implementations, light is emitted by the illuminators 122a, 122b, reflects off the eyes 125a, 125b, and is detected by the cameras 120a, 120b and used to determine eye characteristics of the eyes 125a, 125b.

The eye cameras 120a, 120b may be configured to detect light (i.e., reflections) corresponding to light emitted from the illuminators 122a, 122b. For example, the illuminators 122a, 122b may be configured to produce light in a near-infrared wavelength range and the cameras 120a, 122b may be configured to capture light in the same (or similar) near-infrared wavelength range. The illuminators 120a, 120b may emit light of specific polarization to increase SNR and mitigate ambient cross-talk.

In other implementations, illuminators are not used and the eye cameras 120a, 120b capture images of reflected ambient light from the eyes 125a, 125b.

In various implementations, the device 100 may be a head-mounted device (HMD), a wearable device, a hand-held device, or a device designed for other purposes for which eye tracking is appropriate. The device 100 may include components for displaying content or making content visible to the user. For example, the two content viewing portions 130a, 130b may be transparent lenses through which the user is able to view the surrounding physical environment. In some implementations, content is displayed via such otherwise transparent lenses, e.g., using one or more waveguides to form images on the lenses that are visible to the eyes 125a, 125b, respectively. In another example, the two content viewing portions 130a, 130b are non-transparent displays that display images, emitting light towards or onto the eyes 125a, 125b. The device 100 may display content to the eyes 125a, 125b and track the eyes 125a, 125 while the eyes 125a, 125b are viewing content through or on the viewing portions 130a, 130b, e.g., tracking the gaze direction and/or pupil positions of the eyes 125a, 125b and determining a portion of the content/physical environment that is being gazed upon based on the gaze direction.

In eye tracking and similar applications, it may be beneficial to have a fast and power-efficient device 100. Such a device may be enabled to track eye characteristics at a high frame rate (e.g., 90 fps or more) using eye cameras that capture images of the eyes at a relatively lower frame rate (e.g., each eye camera capturing images at 45 fps or less).

Rather that using eye cameras that capture images of the eye at the same time instances (e.g., synchronized to capture both eyes as 90 fps), some implementations disclosed herein use eye tracking multiplexing (ETM) to capture images of each eye in a staggered, sequential manner, e.g., at half a desired frame rate. Predictions may be used to use the staggered lower capture-rate images to effectively output eye characteristics at a higher desired frame rate. Doing so may reduce power, compute, and/or memory usage of the device 100 than what would otherwise be required. In one example, left and right eye cameras are run at X/2 frame rates, where X is a desired rate of tracking an eye characteristic. The left and right eye cameras are run with a 1/X sec (e.g., ~11 ms when X=90 fps) phase offset. Eye characteristics for a given eye between eye captures of that eye are filled in using the other eye's information and/or a predicted relationship (e.g., history of vergence and instantaneous IPD) between the eyes.

Some implementations are able to efficiently use device 100 resources without reducing eye tracking rate (e.g., from 90 fps) or introducing latency. This increased efficiency without reduced rate/latency may be based on predictions of relationships between eye characteristics. For example, such predictions based on recognizing that in many circumstances, for short time intervals (e.g., above 10 fps), that the eyes mostly move in tandem, the angle of separation between gaze direction remains roughly the same, etc. The device 100 may capture images of/track one eye at a time but alternate illumination/capture/tracking while achieving a combined sampling rate for eye tracking. This may involve filling in eye characteristic predictions between eye captures for a given eye. In one example, this involves, for an intermediate time, using a last sample/capture of the eye. In another example, this involves using a history of vergence to predict an eye characteristic between samples/captures.

Figure 2:
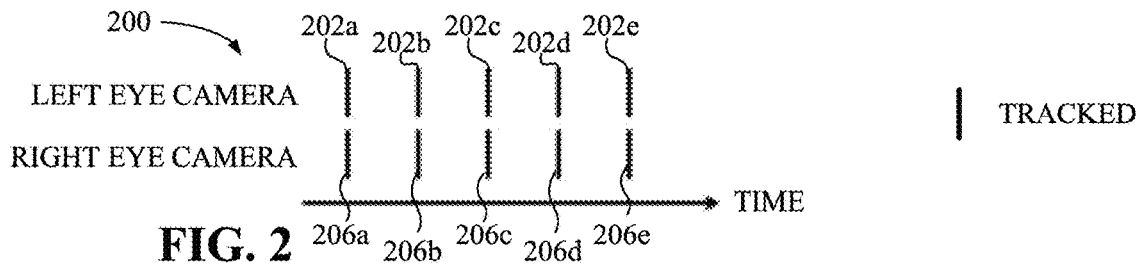
FIG. 2 illustrates an example timeline of capturing eye images for eye tracking.

FIG. 2 illustrates an example of capturing eye images for eye tracking. In this example, images of both the right eye and the left eye are captured at the same rate at approximately the same times and used to track an eye characteristic of each eye. The left eye camera captures an image 202a that is used to determine the eye characteristic of the left eye at approximately the same time that the right eye camera captures an image 206a that is used to determine the eye characteristic of right eye. The left eye camera captures an image 202b that is used to determine the eye characteristic of the left eye at approximately the same time that the right eye camera captures an image 206b that is used to determine the eye characteristic of right eye. The left eye camera captures an image 202c that is used to determine the eye characteristic of the left eye at approximately the same time that the right eye camera captures an image 206c that is used to determine the eye characteristic of right eye. The left eye camera captures an image 202d that is used to determine the eye characteristic of the left eye at approximately the same time that the right eye camera captures an image 206d that is used to determine the eye characteristic of right eye. The left eye camera captures an image 202e that is used to determine the eye characteristic of the left eye at approximately the same time that the right eye camera captures an image 206e that is used to determine the eye characteristic of right eye. Eye tracking is thus accomplished at the frame rate that each of the cameras is capturing images.

FIGS. 3-6 illustrate examples of staggering the capture of eye images and predicting intermediate eye characteristic to provide eye tracking in accordance with some implementations.

Figure 3:
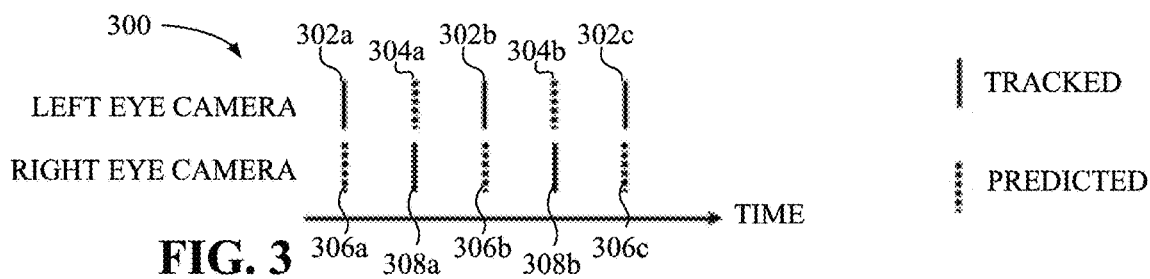
FIGS. 3-6 illustrate examples of staggering the capture of eye images and predicting intermediate eye characteristic to provide eye tracking in accordance with various implementations.

In FIG. 3, the left eye camera and the right eye camera capture images at ½ the rate illustrated in FIG. 2. However, the image captures are staggered and predictions are made during the intervals between captures of each of the eyes. In this example, the left eye camera captures images 302a, 302b, 302c and eye tracking predictions 304a, 304b are made for the intervals between these captures. Similarly, the right eye camera captures images 308a, 308b and predictions 306a, 306b, 306c are made during the intervals before, between, and after these captures, respectively.

Figure 4:
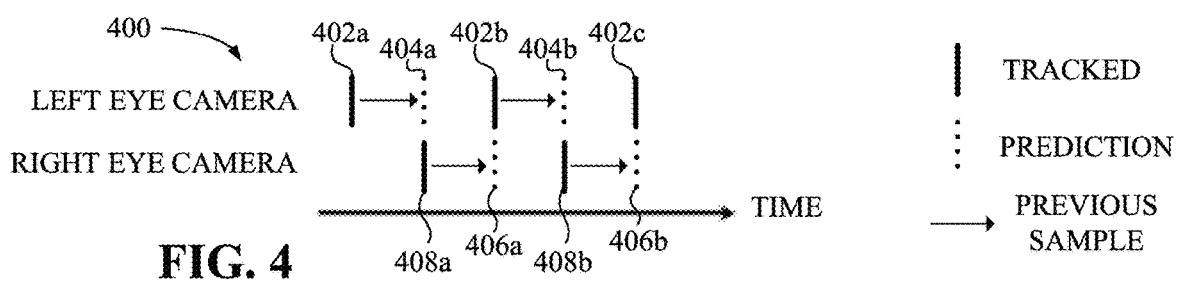

In FIG. 4, the left eye camera and the right eye camera capture images at ½ the rate illustrated in FIG. 2. However, the image captures are staggered and predictions are made during the intervals between captures of each of the eyes. In this example, the left eye camera captures images 402a-c and the right eye camera captures images 408a-b. These image captures 402a-c and 408a-b are used to make predictions for times between the image captures made by each eye. The image 402a is used for prediction 404a during the interval between image 402a and image 402b. The image 402b is used for the prediction 404b during the interval between image 402b and image 402c. Similarly, the image 408a is used for prediction 406a during the interval between image 408a and image 408b. The image 408b is used for the prediction 406b during the interval following image 408b.

Figure 5:
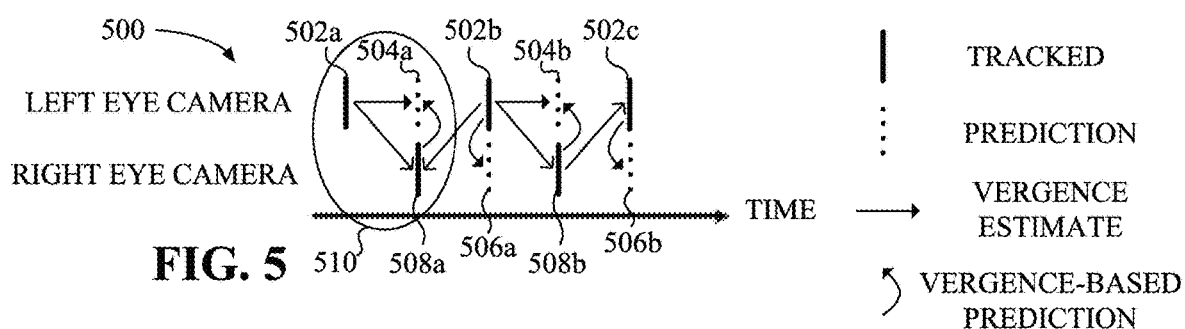

In FIG. 5, the left eye camera and the right eye camera capture images at ½ the rate illustrated in FIG. 2. However, the image captures are staggered and predictions are made during the intervals between captures of each of the eyes. In this example, the left eye camera captures images 502a-c and the right eye camera captures images 508a-b, and left eye predictions 504a-b and right eye predictions 506a-b are made. In this example, vergence-based predictions are made to fill in predictions between captures. For example, for the approximate time of image 508a captured by the right eye camera, a prediction 504a is made for the left eye based on a predicted vergence between the eyes at that time. In this example, given an estimate of the right eye gaze direction and the predicted vergence, a left eye gaze prediction for that approximate time may be made. The vergence estimate may be made based on the prior gaze direction of the left eye (e.g., based on image 502a) and/or a subsequent gaze direction of the left eye (e.g., based on image 502b). In this example, a 1-sample vergence prediction is illustrated as illustrated by circle 510, encircling the data used in the vergence-based prediction.

Figure 6:
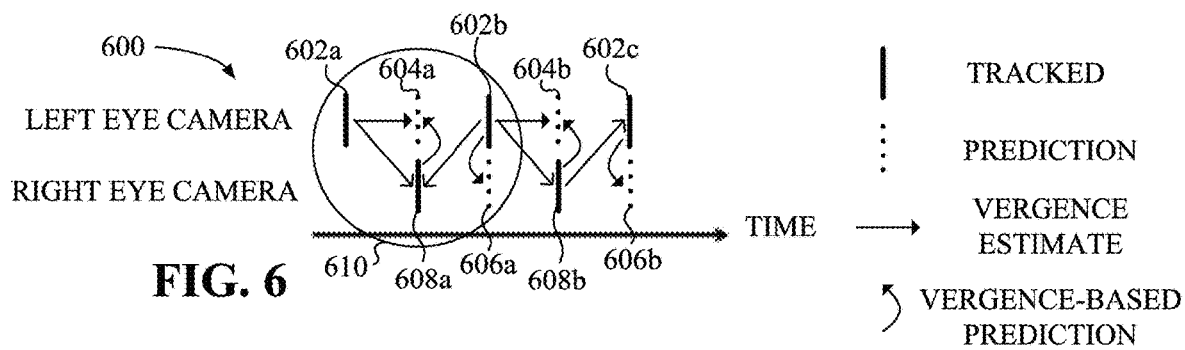

In FIG. 6, the left eye camera and the right eye camera capture images at ½ the rate illustrated in FIG. 2. However, the image captures are staggered and predictions are made during the intervals between captures of each of the eyes. In this example, the left eye camera captures images 602a-c and the right eye camera captures images 608a-b, and left eye predictions 604a-b and right eye predictions 606a-b are made. In this example, vergence-based predictions are made to fill in predictions between captures. In this example, for the approximate time of image 608a captured by the right eye camera, a prediction 604a is made for the left eye based on a predicted vergence between the eyes at that time. In this example, given an estimate of the right eye gaze direction and the predicted vergence, a left eye gaze prediction for that approximate time may be made. The vergence estimate may be made based on prior gaze directions of the left eye (e.g., based on image 602a and image 602b) and/or a subsequent gaze direction(s) of the left eye (e.g., based on image 602c). In this example, a 2-sample vergence prediction is illustrated as illustrated by circle 610, encircling the data used in the vergence prediction.

Gaze directions may be considered or modeled using gaze rays that are 3D vectors indicating which way the visual axis or line-of-sight is directed. The gaze directions of the user's two eyes may be used to determine or predict a vergence. However, the two eyes' 3D gaze rays may not necessarily intersect in space. To address this potential issue, vergence may be computed by projecting the 3D vectors to horizontal (i.e., yaw or azimuth) and vertical (i.e., pitch or elevation) components and taking the difference between the left and right eye gaze angles. FIG. 7 illustrates an example monocular horizontal gaze angle $\alpha$ 700. This can be determined for each eye and used to determine a horizontal vergence. For example, FIG. 8 illustrates an example horizontal vergence 800 determined as $v=\alpha_L+\alpha_R$. FIG. 9 illustrates an example of using the monocular vertical gaze angle $\beta$ for each eye (angle $\beta_L$ 902 for the left eye and angle $\beta_R$ 904 for the right eye) to determine a vertical vergence, which may be determined as $v=\beta_L-\beta_R$.

FIG. 8 also illustrates an inter-pupillary distance (IPD) 810. IPD usually refers to inter-pupillary distance when a person is looking at a far object (or infinity). However, during normal behavior, IPD changes as the person looks at objects at various distances. This dynamically changing distance vector is referred to herein as instantaneous inter-pupillary distance (IIPD). Note the IPD is a distance, but IIPD is a 3D vector and that usually IIPD<=IPD for people with normal oculomotor alignment and health.

FIG. 10 is a flowchart representation of a method 1000 of tracking an eye characteristic. The method 1000 may be performed by a device, such as a mobile device, desktop, laptop, or server device. The method can be performed on a head-mounted device (HMD). The method may be performed by processing logic, including hardware, firmware, software, or a combination thereof. The method may be performed by a processor executing code stored in a non-transitory computer-readable medium (e.g., a memory).

At block 1010, the method 1000 staggers capture of images of a first eye and a second eye of a user. The images of the first eye are captured at approximately a first frame rate at capture times and the images of the second eye are also captured at approximately the first frame rate. However, the images of second eye are captured between the capture times of the images of the first eye. In some implementations, the first frame rate is n/2, where the images of the first eye and the images of the second eye are captured with a 1/n phase offset. Staggered image captures are illustrated in FIGS. 3-7. The images of the eyes may each comprise a matrix of pixel values representing light detected by pixel of an image sensor of the camera. The images may correspond to light reflected off the surface of an eye. The images may correspond to light generated by an illuminator that is reflected off the surface of the eye. The images may correspond to a particular wavelength of light, e.g., near IR light.

At block 1020, the method 1000 determines an eye characteristic of the first eye at the capture times based on the images of the first eye. This may involve determining gaze directions of the first eye at the capture times based on the images of the first eye. This may involve determining pupil positions of the first eye at the capture times based on the images of the first eye. Pupil positions may be determined in a 3D coordinate system or relative to the second eye.

At block 1030, the method 1000 predicts relationships between the first eye and the second eye between captures of the images of the first eye. Predicting the relationships may involve predicting vergence values between captures of the images of the first eye. For example, this may involve tracking a vergence history of vergences determined for one or more previous points in time. In one example, the vergence values are predicted based on a vergence history comprising a vergence determined for a prior time, as illustrated in FIG. 5. In another example, the vergence values are predicted based on a vergence history comprising vergence values determined for multiple prior times, as illustrated in FIG. 6. Predicting the relationships may involve predicting interpupillary distances (IPD) values between captures of the images of the first eye. Such predicted IPD values may be instantaneous inter-pupillary values (IIPD), as illustrated in FIG. 8. IIPD values may be predicted based on an IPD history comprising an instantaneous IPD value determined for one or more prior times/frames.

In some implementations, a machine learning model is used to predict vergence values and/or pupil positions given a staggered image stream. A machine learning model may include models that use neural networks, decision trees, linear regression, support vector machines, and the like. A machine learning model may be trained based on training data, e.g., ground truth data, that identifies the eye characteristic for a given set of training inputs. A machine learning model may be trained, for example, using ground truth data that includes complete image sets for both eyes (e.g., both eyes captured at 90 fps) to predict intermediate frame values for incomplete staggered image sets (e.g., using on half of the images of each eye at 45 fps) as the input. In another example, vergence and/or pupil positions may be manually labelled.

At block 1040, the method 1000 determines the eye characteristic of the first eye between the captures of the images of the first eye. The eye characteristic of the first eye between the captures of the images of the first eye may be determined based on: (a) the images of the second eye captured between the captures of the images of the first eye 1042; and/or the predicted relationships (of the eyes) between the captures of the images of the first eye 1044.

In some implementations, determining the eye characteristic involves determining gaze directions of the first eye at times between the captures of the images of the first eye based on the images of the second eye captured between the captures of the images of the first eye and the predicted vergence values between the captures of the images of the first eye. In some implementations, the gaze directions of the first eye at the capture times and the gaze directions of the first eye at the intermediate times are 3D vectors corresponding to a visual axis of the first eye or line of sight.

In some implementations, determining the eye characteristic involves determining pupil positions of the first eye at times between the captures of the images of the first eye based on the images of the second eye captured between the captures of the images of the first eye and the predicted IPD values between the captures of the images of the first eye.

Method 1000 may provide eye characteristics at a frame rate (e.g., 90 fps) that is greater than the frame rate at which images of the individual eyes are captured. For example, the method 100 may determine gaze directions and/or pupil positions for each of the first eye and the second eye at a second frame rate that is twice the first frame rate.

In some implementations, the method 1000 tracks one or more eye characteristics using images of a user's eyes by modeling the user's eye and/or a portion of the user's head including the user's eyes (e.g., modeling the positional relationship between the user's eyes) and making predictions over time based on the model of the user's eyes/head. Such a model may include positions of pupil centers, cornea centers, eyeball centers, etc. In some implementations, image and/or other sensor data is used to update a model of the user's eyes. For example, light sensor data may be input to a machine learning model that determines where the eye is gazing and/or the state of the muscles of the eye. Certain muscle states may be associated with certain gaze directions, pupil positions, vergence values, IIPDs, or other eye characteristic states. Moreover, over time, patterns of muscle behavior may be used to predict future muscle behavior and thus predict future gaze directions and/or other eye characteristics. Sensor data about an eye may be used to determine eye rotations and other measurements and those rotations and measurements may be decomposed into to values for the stiffness and behavior of eye muscles using an oculomotor eye model.

In some implementations, post-processing of eye characteristic tracking is employed. Noise in the tracked eye characteristic can be reduced using filtering and prediction methods, for example, using a Kalman filter. These methods can also be used for interpolation/extrapolation of the gaze direction/pupil position/vergence/IIPD over time.

In some implementations, the use of staggered image capture is used adaptively over time based on various criteria including, but not limited to, whether the device is running on battery or plugged in, the current battery power, the current processing demands, user preferences, the speed of eye movements, the activity in which the user is engaged (e.g., whether the activity requires more or less accuracy and/or requires more or less efficiency), and/or the current level of accuracy that is being achieved using staggered data.

Tracked eye characteristics such as gaze direction and IIPD can be used for numerous purposes. In one example, gaze direction is used to identify a virtual or real item, e.g., to identify what physical object, user interface button, image, text, or other item a user is looking at. In another example, gaze is used to display a movement of a graphical indicator (e.g., a cursor or other user-controlled icon). In another example, gaze is used to provide input. For example, a particular gaze movement pattern can be recognized and interpreted as a particular command.

In the examples discussed herein, techniques are described that illustrate eye tracking where there are one or more cameras capturing images of both eyes or each eye separately. However, the techniques and innovations described herein idea may be applied in other eye tracking contexts. For instance, the techniques may be applied to a scleral search coil method in which users wear special contact lenses with metal coils in them and sit inside specifically designed electromagnetic fields. By measuring induced current in the coils, gaze angles may be measured very accurately. The techniques disclosed herein are also applicable to electrooculography in which metal electrodes/probes are connected to a user's face (e.g., skin) on each side of the eye and the voltage (e.g., DC) is measures. Since eyeball naturally have a certain electrical potential along optical axis of the eye (i.e., the back of the eye is negatively charged and the surface of the cornea is positively charged), with gaze movement, this electrical field vector also moves. This can be measured by those electrodes/probes. Some implementations use a pair of electrodes for each dimension of gaze (horizontal and vertical), e.g., a total of four electrodes per eye. These other implementations may use significantly lower power than video-based alternatives and may not require as much processing of sensed raw data to estimate gaze angles.

Figure 11:
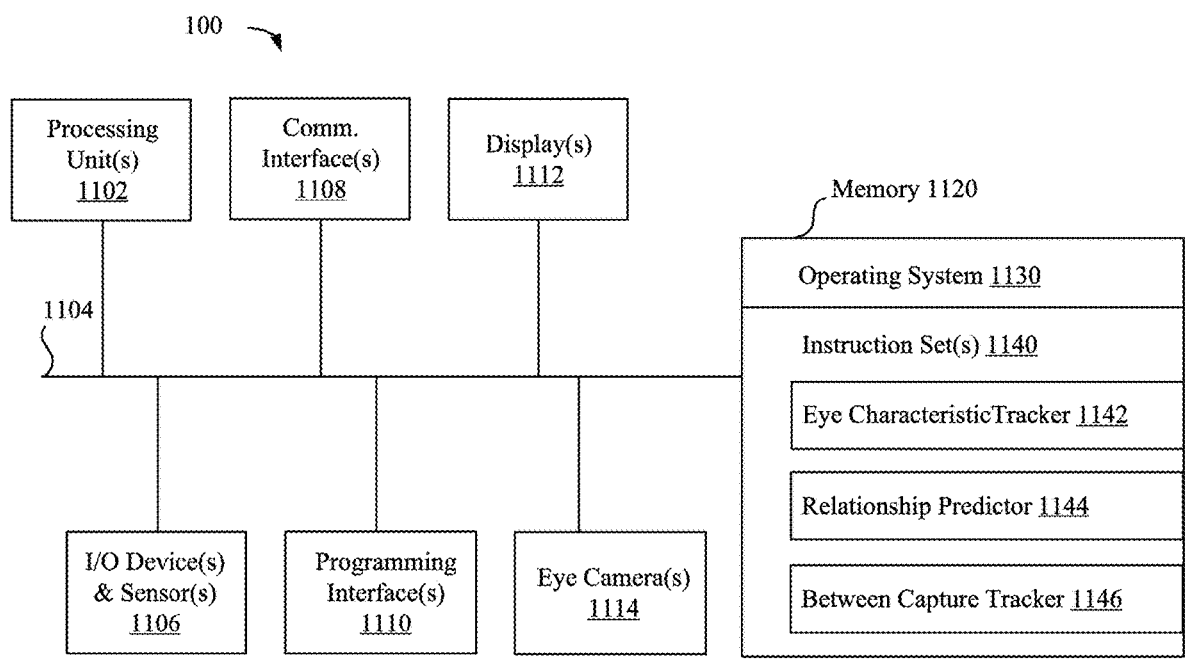
FIG. 11 is a block diagram of components of the exemplary device of FIG. 1 in accordance with some implementations.

FIG. 11 is a block diagram of data acquisition and processing features of the device 100 of FIG. 1. The device 100 may include software, firmware, and/or hardware. The device 100 may be configured to present an environment (e.g., augmented reality, virtual reality, etc.) to a user while the user is within the physical environment. The device 100 may enable optical see-through of the physical environment. The user may wear the device 100 as a head mounted device (HMD) on his or her head. The device 100 may be positioned within or enclose the field-of-view of the user. The device 100 may be a handheld device (e.g., a smartphone or a tablet).

The device 100 includes one or more processing units 1102 (e.g., microprocessors, ASICs, FPGAs, GPUs, CPUs, processing cores, and/or the like), one or more input/output (I/O) devices and sensors 1106, one or more communication interfaces 1108 (e.g., USB, FIREWIRE, THUNDERBOLT, IEEE 802.3x, IEEE 802.11x, IEEE 802.16x, GSM, CDMA, TDMA, GPS, IR, BLUETOOTH, ZIGBEE, SPI, I2C, and/or the like type interface), one or more programming (e.g., I/O) interfaces 1110, one or more displays 1112, a memory 1120, and one or more communication buses 1104 for interconnecting these and various other components. The one or more communication buses 1104 may include circuitry that interconnects and controls communications between components.

The one or more I/O devices and sensors 1106 may include one or more eye cameras, one or more other cameras, one or more light sensors, one or more inertial measurement units (IMUs), one or more accelerometers, one or more magnetometers, one or more gyroscopes, one or more thermometers, one or more physiological sensors (e.g., blood pressure monitor, heart rate monitor, blood oxygen sensor, etc.), one or more microphones, one or more speakers, one or more haptics engines, one or more depth sensors (e.g., a structured light, a time-of-flight, or the like), and/or the like.

A camera may include one or more RGB cameras (e.g., with a complimentary metal-oxide-semiconductor (CMOS) image sensor or a charge-coupled device (CCD) image sensor), monochrome cameras, IR cameras, and/or the like. A camera may be a frame/shutter-based camera that, at a particular point in time or multiple points in time at a frame rate, generates an image, e.g., of an eye of the user. Each image may include a matrix of pixel values corresponding to pixels of the image which correspond to locations of a matrix of light sensors of the camera.

The one or more I/O devices and sensors 1106 may include other types of light sensors including, but not limited to photosensitive surface or photodetectors.

The one or more displays 1112 correspond to holographic, digital light processing (DLP), liquid-crystal display (LCD), liquid-crystal on silicon (LCoS), organic light-emitting field-effect transitory (OLET), organic light-emitting diode (OLED), surface-conduction electron-emitter display (SED), field-emission display (FED), quantum-dot light-emitting diode (QD-LED), micro-electromechanical system (MEMS), and/or the like display types. The one or more displays 1112 may correspond to diffractive, reflective, polarized, holographic, etc. waveguide displays.

The memory 1120 includes high-speed random-access memory, such as DRAM, SRAM, DDR RAM, or other random-access solid-state memory devices. The memory 320 may include non-volatile memory, such as one or more magnetic disk storage devices, optical disk storage devices, flash memory devices, or other non-volatile solid-state storage devices. The memory 1120 optionally includes one or more storage devices remotely located from the one or more processing units 1102. The memory 1120 comprises a non-transitory computer readable storage medium. The memory 1120 or the non-transitory computer readable storage medium of the memory 1120 may store the following programs, modules and data structures, or a subset thereof including an optional operating system 1130 and instruction sets 1140.

The operating system 1130 includes procedures for handling various basic system services and for performing hardware dependent tasks. The instruction sets 1140 may provide various function on device 100. To that end, in various implementations, the instruction sets 1140 include an eye characteristic tracker 1142, a relationship predictor 1144, and a between capture tracker 1146. The eye characteristic tracker 1142 is configured to assess eye characteristics via one or more of the techniques disclosed herein. The relationship 1144 is configured to predict one or more relationships between the eyes of the user, e.g., vergence, IIPD, etc., via one or more of the techniques disclosed herein. The between capture tracker 1146 is configured to assess eye characteristics of each eye between capture of images via one or more of the techniques disclosed herein.

Although these elements are shown as residing on a single device (e.g., the device 100), it should be understood that in other implementations, any combination of the elements may be located in separate computing devices. Moreover, FIG. 4 is intended more as functional description of the various features which are present in a particular implementation as opposed to a structural schematic of the implementations described herein. As recognized by those of ordinary skill in the art, items shown separately could be combined and some items could be separated. For example, some functional modules shown separately could be implemented in a single module and the various functions of single functional blocks could be implemented by one or more functional blocks in various implementations. The actual number of modules and the division of particular functions and how features are allocated among them will vary from one implementation to another and, in some implementations, depends in part on the particular combination of hardware, software, and/or firmware chosen for a particular implementation.

Numerous specific details are set forth herein to provide a thorough understanding of the claimed subject matter. However, those skilled in the art will understand that the claimed subject matter may be practiced without these specific details. In other instances, methods apparatuses, or systems that would be known by one of ordinary skill have not been described in detail so as not to obscure claimed subject matter.

Unless specifically stated otherwise, it is appreciated that throughout this specification discussions utilizing the terms such as "processing," "computing," "calculating," "determining," and "identifying" or the like refer to actions or processes of a computing device, such as one or more computers or a similar electronic computing device or devices, that manipulate or transform data represented as physical electronic or magnetic quantities within memories, registers, or other information storage devices, transmission devices, or display devices of the computing platform.

The system or systems discussed herein are not limited to any particular hardware architecture or configuration. A computing device can include any suitable arrangement of components that provides a result conditioned on one or more inputs. Suitable computing devices include multipurpose microprocessor-based computer systems accessing stored software that programs or configures the computing system from a general-purpose computing apparatus to a specialized computing apparatus implementing one or more implementations of the present subject matter. Any suitable programming, scripting, or other type of language or combinations of languages may be used to implement the teachings contained herein in software to be used in programming or configuring a computing device.

Implementations of the methods disclosed herein may be performed in the operation of such computing devices. The order of the blocks presented in the examples above can be varied for example, blocks can be re-ordered, combined, and/or broken into sub-blocks. Certain blocks or processes can be performed in parallel.

The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or value beyond those recited. Headings, lists, and numbering included herein are for ease of explanation only and are not meant to be limiting.

It will also be understood that, although the terms "first," "second," etc. may be used herein to describe various elements, these elements should not be limited by these terms. These terms are only used to distinguish one element from another. For example, a first node could be termed a second node, and, similarly, a second node could be termed a first node, which changing the meaning of the description, so long as all occurrences of the "first node" are renamed consistently and all occurrences of the "second node" are renamed consistently. The first node and the second node are both nodes, but they are not the same node.

The terminology used herein is for the purpose of describing particular implementations only and is not intended to be limiting of the claims. As used in the description of the implementations and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in accordance with a determination" or "in response to detecting," that a stated condition precedent is true, depending on the context. Similarly, the phrase "if it is determined [that a stated condition precedent is true]" or "if [a stated condition precedent is true]" or "when [a stated condition precedent is true]" may be construed to mean "upon determining" or "in response to determining" or "in accordance with a determination" or "upon detecting" or "in response to detecting" that the stated condition precedent is true, depending on the context.

The foregoing description and summary of the invention are to be understood as being in every respect illustrative and exemplary, but not restrictive, and the scope of the invention disclosed herein is not to be determined only from the detailed description of illustrative implementations but according to the full breadth permitted by patent laws. It is to be understood that the implementations shown and described herein are only illustrative of the principles of the present invention and that various modification may be implemented by those skilled in the art without departing from the scope and spirit of the invention.

What is claimed is:

1. A device comprising:
one or more image sensors configured to stagger capture of images of a first eye and a second eye of a user, wherein images of the first eye are captured at approximately a first frame rate at capture times and images of the second eye are captured at approximately the first frame rate, wherein the images of second eye are captured between the capture times of the images of the first eye;
a processor; and
a computer-readable storage medium comprising instructions that upon execution by one or more processors cause the device to perform operations comprising:
determining gaze directions of the first eye at the capture times based on the images of the first eye;
predicting vergence values between captures of the images of the first eye, wherein each of the predicting vergence values is estimated based on (a) a gaze direction of the second eye based on an image of the second eye captured between a prior image capture of the first eye and a subsequent image capture of the first eye (b) a gaze direction of the first eye determined based on the prior image capture of the first eye or the subsequent image capture of the first eye; and
determining gaze directions of the first eye at times between the captures of the images of the first eye based on:
the images of the second eye captured between the captures of the images of the first eye; and
the predicted vergence values between the captures of the images of the first eye.

2. The device of claim 1, wherein the operations determine gaze directions for each of the first eye and the second eye at a second frame rate that is greater than the first frame rate.

3. The device of claim 1, wherein the operations determine gaze directions for each of the first eye and the second eye at a second frame rate that is twice the first frame rate.

4. The device of claim 1, wherein the vergence values are predicted based on a vergence history comprising a vergence determined for a prior time.

5. The device of claim 1, wherein the vergence values are predicted based on a vergence history comprising vergence values determined for multiple prior times.

6. The device of claim 1, wherein the first frame rate is n/2, wherein the images of the first eye and the images of the second eye are captured with a 1/n phase offset.

7. The device of claim 1, wherein the gaze directions of the first eye at the capture time and the gaze directions of the first eye at the intermediate times are 3D vectors corresponding to a visual axis of the first eye or line of sight.

8. A device comprising:
one or more image sensors configured to stagger capture of images of a right eye and a left eye of a user, wherein images of the first eye are captured at approximately a first frame rate at capture times and images of the second eye are captured at approximately the first frame rate, wherein the images of second eye are captured between the capture times of the images of the first eye;
a processor; and
a computer-readable storage medium comprising instructions that upon execution by one or more processors cause the device to perform operations comprising:
determining pupil positions of the first eye at the capture times based on the images of the first eye;
predicting interpupillary distances (IPD) values between captures of the images of the first eye, the IPD values dynamically changing as the right eye and left eye look at objects at different distances over time; and
determining pupil positions of the first eye at times between the captures of the images of the first eye based on:
the images of the second eye captured between the captures of the images of the first eye; and
the predicted IPD values between the captures of the images of the first eye.

9. The device of claim 8, wherein the operations determine pupil positions for each of the first eye and the second eye at a second frame rate that is greater than the first frame rate.

10. The device of claim 8, wherein the operations determine pupil positions for each of the first eye and the second eye at a second frame rate that is twice the first frame rate.

11. The device of claim 8, wherein the instantaneous IPD values are predicted based on an IPD history comprising an instantaneous IPD value determined for a prior time.

12. The device of claim 8, wherein the instantaneous IPD values are predicted based on an IPD history comprising instantaneous IPD values determined for multiple prior times.

13. The device of claim 8, wherein the first frame rate is n/2, wherein the images of the first eye and the images of the second eye are captured with a 1/n phase offset.

14. The device of claim 8, wherein the pupil positions of the first eye at the capture time and the pupil positions of the first eye between the captures of the images of the first eye are positions within a 3D coordinate system.

15. A method comprising:
staggering capture of images of a first eye and a second eye of a user, wherein images of the first eye are captured at approximately a first frame rate at capture times and images of the second eye are captured at approximately the first frame rate, wherein the images of second eye are captured between the capture times of the images of the first eye;
determining an eye characteristic of the first eye at the capture times based on the images of the first eye;
predicting relationships between the first eye and the second eye between captures of the images of the first eye, wherein predicting the relationships comprises:
predicting vergence values between captures of the images of the first eye, wherein each of the predicting vergence values is estimated based on (a) a gaze direction of the second eye based on an image of the second eye captured between a prior image capture of the first eye and a subsequent image capture of the first eye (b) a gaze direction of the first eye determined based on the prior image capture of the first eye or the subsequent image capture of the first eye; or
predicting interpupillary distances (IPD) values between captures of the images of the first eye, the IPD values dynamically changing as the right eye and left eye look at objects at different distances over time; and determining the eye characteristic of the first eye between the captures of the images of the first eye based on:
the images of the second eye captured between the captures of the images of the first eye; and
the predicted relationships between the captures of the images of the first eye.

16. The method of claim 15, wherein the eye characteristic is gaze direction.

17. The method of claim 15, wherein the eye characteristic is pupil position.

* * * * *